(12) United States Patent
Long et al.

(10) Patent No.: US 8,577,012 B2
(45) Date of Patent: Nov. 5, 2013

(54) SESSION TRANSFER METHOD AND USER EQUIPMENT

(75) Inventors: Shuiping Long, Beijing (CN); Hui Jin, Beijing (CN); Xiaoyan Duan, Beijing (CN); Qiang Yi, Beijing (CN)

(73) Assignee: Huawei Device Co., Ltd., Shenzhen (CN)

( * ) Notice: Subject to any disclaimer, the term of this patent is extended or adjusted under 35 U.S.C. 154(b) by 242 days.

(21) Appl. No.: 13/289,639

(22) Filed: Nov. 4, 2011

(65) Prior Publication Data

US 2012/0081505 A1    Apr. 5, 2012

Related U.S. Application Data

(63) Continuation of application No. PCT/CN2010/072459, filed on May 5, 2010.

(30) Foreign Application Priority Data

May 5, 2009    (CN) .......................... 2009 1 0139157

(51) Int. Cl.
*H04M 3/42*    (2006.01)

(52) U.S. Cl.
USPC .................... 379/212.01; 370/355; 348/14.11

(58) Field of Classification Search
USPC .............. 348/14.01, 14.02, 14.11; 379/93.21, 379/212.01, 88.13; 370/352, 355
See application file for complete search history.

(56) References Cited

U.S. PATENT DOCUMENTS

| | | |
|---|---|---|
| 2007/0280162 A1 | 12/2007 | Deshpande et al. |
| 2008/0267128 A1 | 10/2008 | Bennett et al. |
| 2011/0110326 A1* | 5/2011 | Rexhepi et al. ............... 370/331 |
| 2011/0211525 A1* | 9/2011 | Mahdi ........................... 370/328 |
| 2011/0268083 A1* | 11/2011 | Ostrup et al. ................. 370/331 |

FOREIGN PATENT DOCUMENTS

| | | |
|---|---|---|
| CN | 101150532 A | 3/2008 |
| WO | WO 01/82551 A2 | 11/2001 |

OTHER PUBLICATIONS

Written Opinion of the International Searching Authority dated Aug. 12, 2010 in connection with International Patent Application No. PCT/CN2010/072459.
"3rd Generation Partnership Project; Technical Specification Group Services and Architecture; IP Multimedia Subsystem (IMS) Service Continuity; Stage 2 (Release 8)", 3GPP TS 23.237 v8.3.0, Mar. 2009, 40 pages.
International Search Report dated Aug. 12, 2010 in connection with International Patent Application No. PCT/CN2010/072459.
Extended European Search Report dated May 9, 2012 in connection with European Patent Application No. 10772023.7, 7 pages.
"3rd Generation Partnership Project; Technical Specification Group Services and System Aspects; IP Multimedia Subsystem (IMS) Service Continuity Enhancements, Service, Policy and Interaction; Stage 2 (Release 9)", 3GPP TR 23.838 v1.1.0, Apr. 2009, 53 pages.

* cited by examiner

*Primary Examiner* — Olisa Anwah

(57) ABSTRACT

In the field of communications, a session transfer method and a User Equipment (UE) are provided, so as to solve the problem that when a UE is involved in a voice session and a video session at the same time, session transfer cannot be performed. The technical solution according to the present invention includes: determining a session in an active state among a video session and a voice session; and initiating transfer of the session in the active state, so that a network side transfers the session in the active state to a Circuit Switched (CS) domain, and transfers a session in an inactive state among the video session and the voice session. The session transfer method and the UE may be applied in a radio communication network.

15 Claims, 8 Drawing Sheets

SESSION TRANSFER METHOD AND USER EQUIPMENT

CROSS-REFERENCE TO RELATED APPLICATIONS

This application is a continuation of International Application No. PCT/CN2010/072459, filed on May 5, 2010, which claims priority to Chinese Patent Application No. 200910139157.1, filed on May 5, 2009, both of which are hereby incorporated by reference in their entireties.

TECHNICAL FIELD

The present invention relates to the field of communications, and in particular to a session transfer method and a user equipment.

BACKGROUND

In the prior art, when a user equipment (UE) is transferred from a packet switched (PS) domain to a circuit switched (CS) domain, if the UE is involved in multiple voice sessions, the UE may determine a target voice session among the multiple voice sessions, and initiate a transfer request of the target voice session to a service centralization and Continuity application server (SCC AS) of a network side. After the target voice session is transferred to the CS domain, a mobile switching center server (MSC Server) takes the place of the UE to initiate transfer of other voice sessions to the SCC AS, and transfer the other voice sessions to the CS domain, and thereby the transfer of all of the sessions of the UE is completed. If the UE is only involved in a video session (a session including a voice media stream and a video media stream at the same time), the UE initiates transfer of the video session to the SCC AS so as to transfer the video session to the CS domain.

The prior art does not provide a method for transferring sessions of a UE when the UE is involved in a video session and a voice session at the same time, so that when a UE is involved in a voice session and a video session at the same time, the sessions of the UE cannot be transferred.

SUMMARY

Embodiments of the present invention provide a session transfer method and a user equipment, so that sessions of a user equipment can be transferred when the user equipment is involved in a voice session and a video session at the same time.

In order to achieve the foregoing objective, the following technical solutions are adopted in the embodiments of the present invention.

A session transfer method, includes: when sessions of a user equipment are transferred from a packet switched domain to a circuit switched domain and if the user equipment is involved in a video session and a voice session, determining a session in an active state among the video session and the voice session; and initiating transfer of the session in the active state, so that a network side transfers the session in the active state to the circuit switched domain, and transfers a session in an inactive state among the video session and the voice session.

A user equipment, includes:

a determination unit, configured to determine a session in an active state among a video session and a voice session when sessions of the user equipment are transferred from a packet switched domain to a circuit switched domain and if the user equipment is involved in the video session and the voice session; and a transfer unit, configured to initiate transfer of the session in the active state, where the session in the active state is determined by the determination unit, so that a network side transfers the session in the active state to the circuit switched domain, and transfers a session in an inactive state among the video session and the voice session.

In the session transfer method and the user equipment according to the embodiments of the present invention, the session in the active state among the video session and the voice session of the user equipment can be determined, and the transfer of the session in the active state can be initiated, so that the network side can transfer the session in the active state to the circuit switched domain and transfer the session in the inactive state, which achieves the objective that when the user equipment is involved in the video session and the voice session at the same time, the sessions of the user equipment are transferred, and solves the problem that when the user equipment is involved in the video session and the voice session at the same time, the sessions of the user equipment cannot be transferred in the prior art.

Embodiments of the present invention further provide a session transfer method and a user equipment, so that sessions of a user equipment can be transferred when a voice session and a video session exist in the user equipment at the same time.

A session transfer method, includes: when sessions of a user equipment are transferred from a packet switched domain to a circuit switched domain and if the user equipment is involved in a video session and a voice session, determining a session in an active state and a session in an inactive state among the video session and the voice session; releasing the session in the inactive state; and initiating transfer of the session in the active state, so that a network side transfers the session in the active state to the circuit switched domain.

A user equipment, includes:

a determination unit, configured to determine a session in an active state and a session in an inactive state among a video session and a voice session when sessions of the user equipment are transferred from a packet switched domain to a circuit switched domain and if the user equipment is involved in the video session and the voice session; and a release unit, configured to release the session in the inactive state, where the session in the inactive state is determined by the determination unit; and a transfer unit, configured to initiate transfer of the session in the active state, where the session in the active state is determined by the determination unit, so that a network side transfers the session in the active state to the circuit switched domain.

In the session transfer method and the user equipment according to the embodiments of the present invention, when the video session and the voice session of the user equipment are transferred, the session in the inactive state among the video session and the voice session is released, and the transfer of the session in the active state is initiated, so that the network side can transfer the session in the active state to the circuit switched domain, which achieves the objective that when the user equipment is involved in the video session and the voice session at the same time, the session of the user equipment is transferred, and solves the problem in the prior art that when the user equipment is involved in the video session and the voice session at the same time, the session of the user equipment cannot be transferred.

BRIEF DESCRIPTION OF THE DRAWINGS

To illustrate the technical solutions according to the embodiments of the present invention or in the prior art more clearly, accompanying drawings to be used for describing the embodiments or the prior art are introduced briefly in the following. Apparently, the accompanying drawings in the following description are only some embodiments of the present invention, and persons of ordinary skill in the art may derive other drawings from the accompanying drawings without creative efforts.

DETAILED DESCRIPTION

The technical solutions of the present invention will be clearly and completely described in the following with reference to the accompanying drawings. It is obvious that the embodiments to be described are only a part rather than all of the embodiments of the present invention. All other embodiments which are obtained by persons skilled in the art based on the embodiments of the present invention without creative efforts shall fall within the protection scope of the present invention.

In order to solve the problem that session transfer cannot be performed when a UE is involved in a voice session and a video session at the same time, embodiments of the present invention provide a session transfer method and a user equipment.

Figure 1:
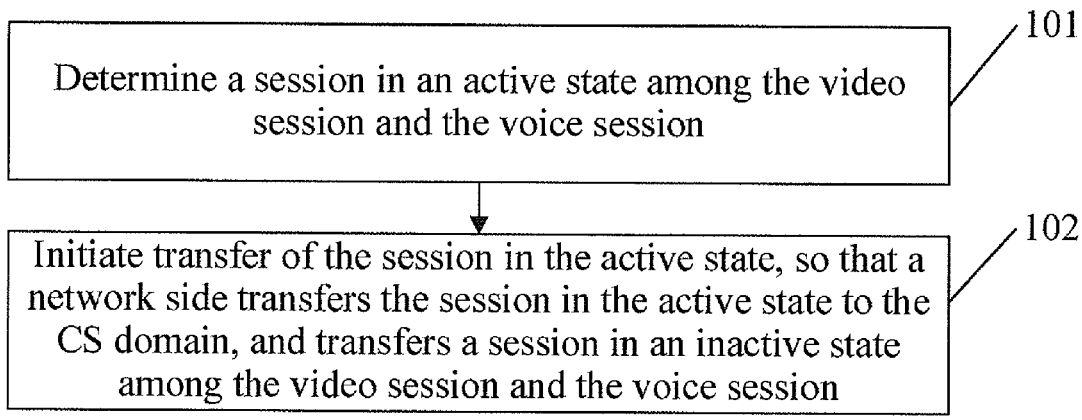
FIG. 1 is a flow chart of a session transfer method according to an embodiment of the present invention.

As shown in FIG. 1, when a UE is transferred from a PS domain to a CS domain and if the UE is involved in a video session and a voice session, a session transfer method provided in an embodiment of the present invention includes the following.

Step 101: Determine a session in an active state among the video session and the voice session.

Step 102: Initiate transfer of the session in the active state, so that a network side transfers the session in the active state to the CS domain, and transfers a session in an inactive state among the video session and the voice session.

Figure 2:
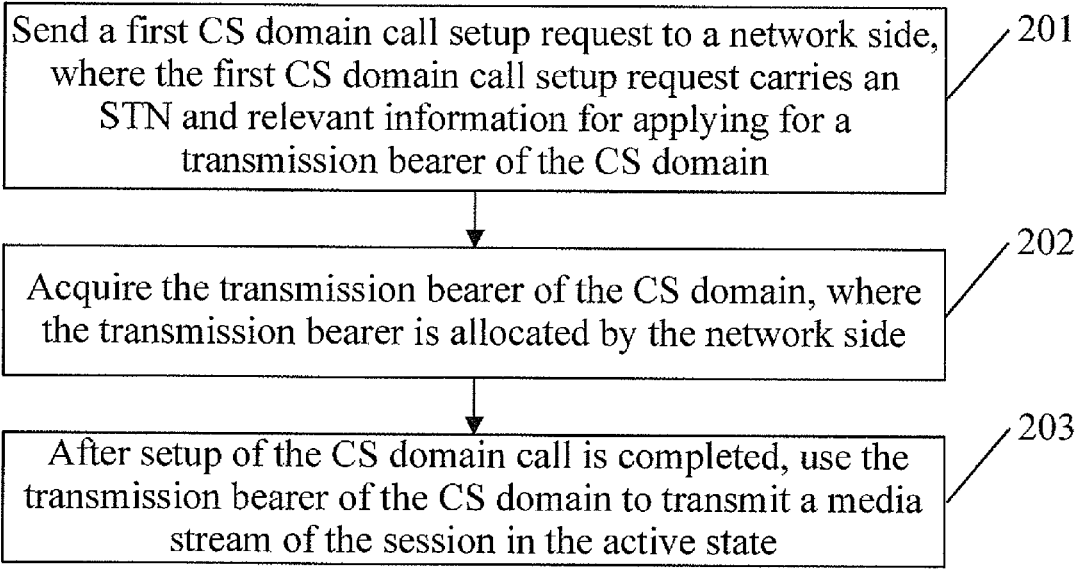
FIG. 2 is a flow chart of step 102 in the session transfer method according to the embodiment of the present invention as shown in FIG. 1.

Furthermore, as shown in FIG. 2, step 102 may include the following.

Step 201: Send a first CS domain call setup request to the network side, where the first CS domain call setup request carries a session transfer number (STN) and relevant information for applying for a transmission bearer of the CS domain.

The first CS domain call setup request is sent to the network side, so that the network side can set up a CS domain call for the UE, and according to the STN carried in the first CS domain call setup request, transfer the session in the active state to the CS domain and transfer the session in the inactive state among the video session and the voice session.

In this embodiment, the relevant information for applying for the transmission bearer of the CS domain may include: information for applying for a multimedia bearer and a voice bearer of the CS domain and indication information indicating that the multimedia bearer or the voice bearer is a current transmission bearer (or a preferred transmission bearer) ; or information for applying for a multimedia bearer of the CS domain; or information for applying for a voice bearer of the CS domain. For example, if the UE and the network side both support a service change and UDI/RDI fallback (SCUDIF) feature, or the UE does not know whether the network side supports the SCUDIF feature, the relevant information for applying for the transmission bearer of the CS domain includes: the information for applying for the multimedia bearer and the voice bearer of the CS domain and the indication information indicating that the multimedia bearer or the voice bearer is the current transmission bearer (or the preferred transmission bearer); in another example, if the UE and/or the network side do not support the SCUDIF feature and the video session is the session in the active state, the relevant information for applying for the transmission bearer of the CS domain is the information for applying for the multimedia bearer of the CS domain; and in yet another example, if the UE and/or the network side do not support the SCUDIF feature and the voice session is the session in the active state, the relevant information for applying for the transmission bearer of the CS domain is the information for applying for the voice bearer of the CS domain.

Step 202: Acquire the transmission bearer of the CS domain, where the transmission bearer is allocated by the network side.

Step 203: After the setup of the CS domain call is completed, use the transmission bearer of the CS domain to transmit a media stream of the session in the active state.

Optionally, after step 102, the step of performing session state conversion on the video session and the voice session in the CS domain may further be included, and may include the following.

1. When the video session is the session in the active state and the voice session is the session in the inactive state:

if the transmission bearers of the CS domain, where the transmission bearers are acquired through application to the network side, are the multimedia bearer and the voice bearer, the voice bearer is indicated as the current bearer, and the voice bearer is used to transmit a media stream of the voice session; and/or if the transmission bearer of the CS domain, where the transmission bearer is acquired through application to the network side, is the multimedia bearer, the multimedia bearer is used to transmit the media stream of the voice session. Furthermore, in order to avoid a meaningless video encoding or decoding, when the multimedia bearer is used to transmit the media stream of the voice session, a video channel of the multimedia bearer may be turned off.

2. When the video session is the session in the inactive state and the voice session is the session in the active state:

if the transmission bearers of the CS domain, where the transmission bearers are acquired through application to the network side, are the multimedia bearer and the voice bearer, the multimedia bearer is indicated as the current bearer, coding negotiation is performed with the network side, and the multimedia bearer is used to transmit a media stream of the video session; and/or if the transmission bearer of the CS domain, where the transmission bearer is acquired through application to the network side, is the voice bearer, a CS domain call supporting the voice bearer is released, a CS domain call supporting the multimedia bearer is set up, and the multimedia bearer is used to transmit the media stream of the video session.

Optionally, before step 102, the method may further include: deleting the video media stream of the video session.

By deleting the video media stream of the video session, the video session may be converted into a voice session, and in a subsequent session transfer process, a method of transferring multiple voice sessions may be used to achieve the objective of transferring the sessions of the UE.

In the session transfer method according to the embodiment of the present invention, the session in the active state among the video session and the voice session of the UE can be determined, and the transfer of the session in the active state can be initiated, so that the network side can transfer the session in the active state to the circuit switched domain, and transfer the session in the inactive state, which achieves the objective that when the UE is involved in the video session and the voice session at the same time, the sessions of the UE are transferred.

In order to enable persons skilled in the art to understand the technical solution according to the embodiment of the present invention more clearly, the session transfer method according to the embodiment of the present invention is described in detail below through specific embodiments.

Embodiment 1: A UE is transferred from a PS domain to a CS domain, the UE is involved in a video session in an active state and a voice session in the inactive state, and the UE and a network side both support the SCUDIF feature.

Figure 3:
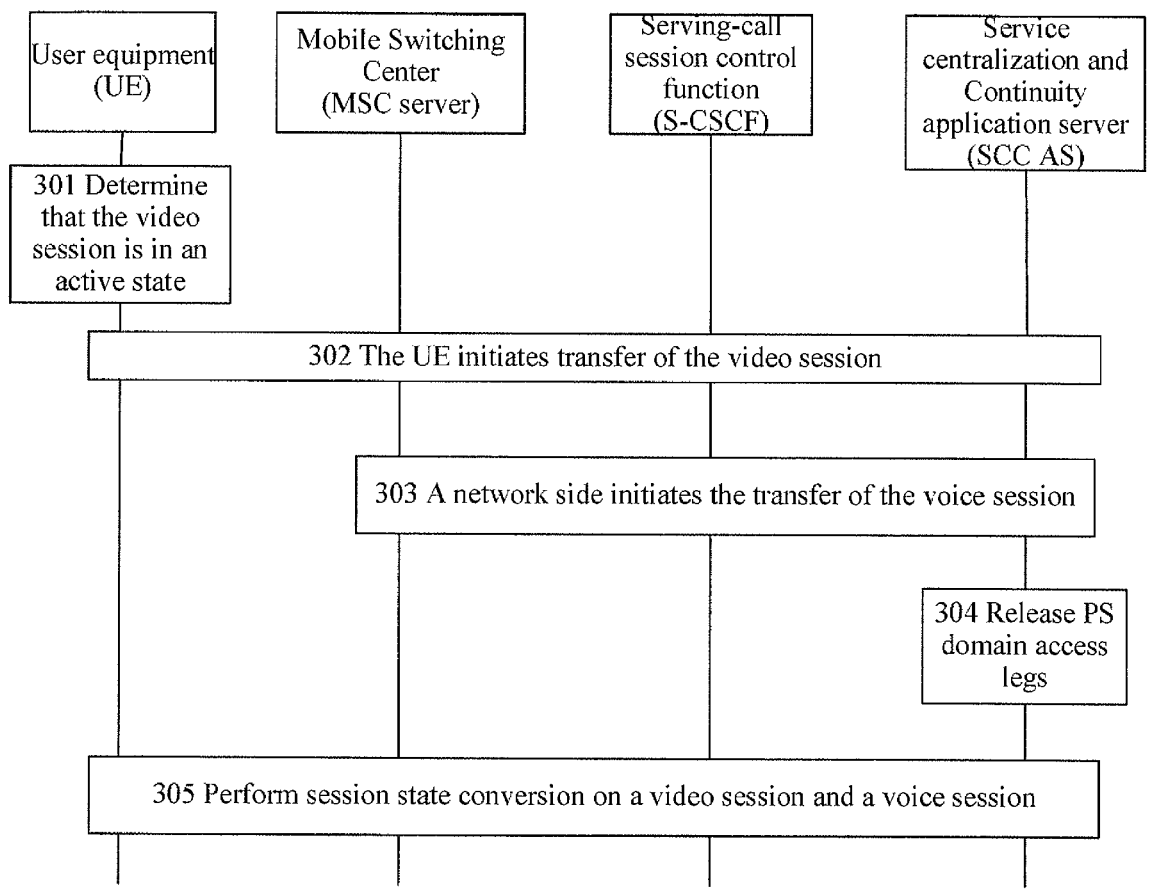
FIG. 3 is a timing diagram of a session transfer method according to Embodiment 1 of the present invention.

As shown in FIG. 3, a session transfer method according to the embodiment of the present invention includes the following.

Step 301: The UE determines that the video session is in an active state.

In this embodiment, the UE already stores session state information, and may determine, according to the session state information, that the video session is in the active state.

Step 302: The UE initiates transfer of the video session to the network side, so that the network side transfers the video session to the CS domain.

Figure 4:
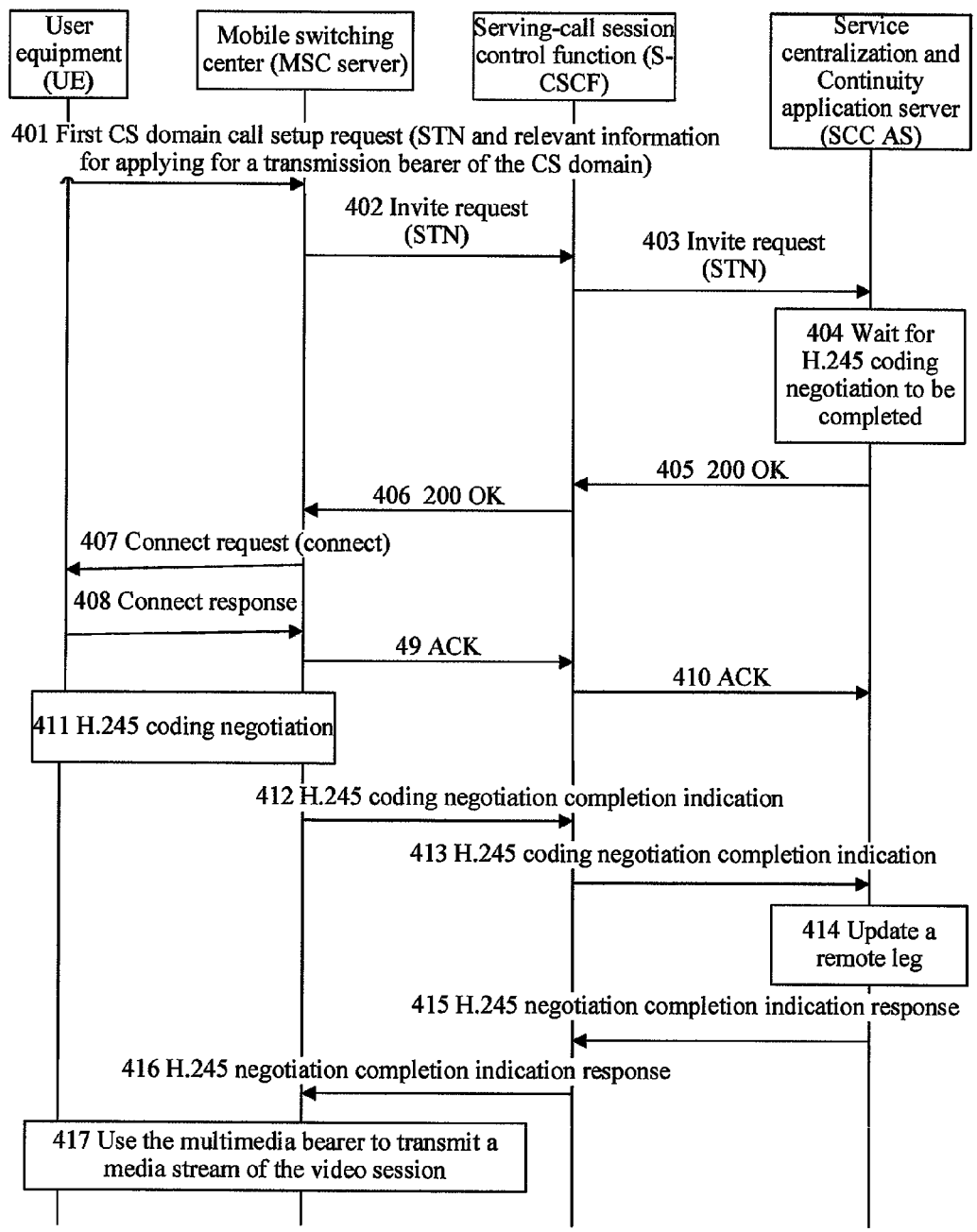
FIG. 4 is a timing diagram of step 302 in the session transfer method according to Embodiment 1 of the present invention as shown in FIG. 3.

As shown in FIG. 4, step 302 may include the following.

Steps 401 to 403: The UE sends a first CS domain call setup request, which carries an STN and relevant information for applying for a transmission bearer of the circuit switched domain, to an SCC AS through an MSC server and a serving-call session control function (S-CSCF).

In this embodiment, the UE and the network side both support the SCUDIF feature, and the relevant information for applying for the transmission bearer of the circuit switched domain includes information for applying for a multimedia bearer and a voice bearer, and indication information indicating that a current transmission bearer (or a preferred transmission bearer) is the multimedia bearer.

Step 404: The SCC AS waits for H.245 coding negotiation to be completed.

Steps 405 to 410: The SCC AS perform confirmation with the UE, and setup of a CS domain access leg for the video session is completed.

Step 411: The UE and the MSC server perform the H.245 coding negotiation in the CS domain.

Steps 412 and 413: After the UE and the MSC server complete the H.245 coding negotiation in the CS domain, the MSC server sends an H.245 negotiation completion indication to the SCC AS.

Step 414: The SCC AS uses the CS domain access leg to update a remote leg (remote leg), where the remote leg is an access leg between the SCC AS and a peer end of the video session of the UE.

Steps 415 and 416: The SCC AS sends an H.245 coding negotiation completion indication response to the MSC server.

Step 417: The UE and the MSC server use the multimedia bearer to transmit media streams (including a voice media stream and a video media stream) of the video session, and complete the transfer of the video session.

Step 303: The network side initiates and completes the transfer of the voice session, which includes the following.

1. The SCC AS sends a video session transfer response to the MSC server, where the transfer response carries session state information of the voice session, or the SCC AS may send the session state information of the voice session to the MSC server through a subscribe/notification mechanism.

In this embodiment, the session state information may include a session state (inactive), a session transfer identifier (STI), and a session media stream (the voice media stream).

2. According to the session state information, the MSC server initiates, to the SCC AS, and completes the transfer of the voice session, which includes the following.

The MSC server sends an Invite request to the SCC AS, where the Invite request carries the STI of the voice session; and The SCC AS completes setup of the CS domain access leg for the voice session, and updates the remote leg of the voice session, completing the transfer of the voice session.

Step 304: After the transfer of the sessions (the video session and the voice session) of the UE is completed, PS domain access legs originally set up for the sessions (the video session and the voice session) of the UE are released.

Optionally, step 305: Perform session state conversion on the video session and the voice session in the CS domain.

In this embodiment, the video session is in the active state, the voice session is in the inactive state, and the state conversion is performed on the video session and the voice session.

That is to say, the video session is converted into one in the inactive state and the voice session is converted into one in the active state.

Figure 5:
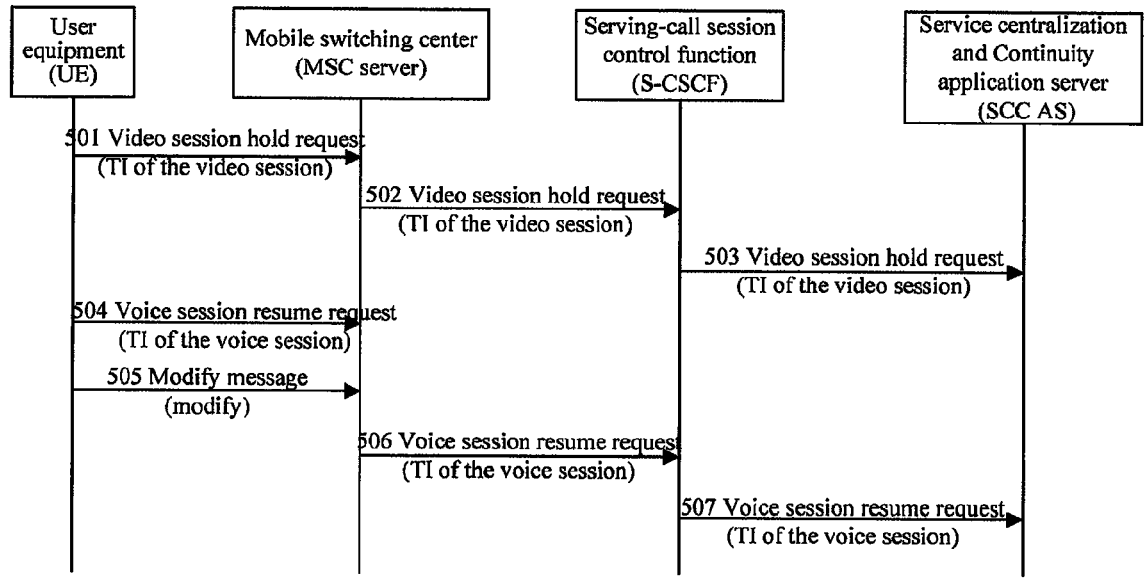
FIG. 5 is a timing diagram of step 305 in the session transfer method according to Embodiment 1 of the present invention as shown in FIG. 3.

As shown in FIG. 5, step 305 may include the following.

Steps 501 to 503: The UE sends a video session hold request to the SCC AS, where the request carries a transaction identifier (TI) associated with the video session, and the SCC AS sends the video hold request to the peer end of the video session of the UE.

Step 504: The UE sends a voice session resume request to the MSC server, where the request carries a transaction identifier (TI) of the voice session.

Step 505: The UE sends a modify message (modify) to the MSC server to indicate that the voice bearer is set as the current bearer, that is, the media capability of the CS domain call is modified to support voice transmission (the media capability of the CS domain call before the state conversion supports voice transmission and video transmission at the same time), and uses the voice bearer to transmit a media stream of the voice session.

In practical use, step 505 may also be initiated by the network side, which is not described repeatedly herein.

Steps 506 and 507: The MSC server sends the voice session resume request to the SCC AS, and the SCC AS sends the request to a peer end of the voice session of the UE, completing the state conversion of the video session and the voice session.

Optionally, in this embodiment, before step 302, the method may further include: deleting the video media stream of the video session.

By deleting the video media stream of the video session, the video session can be converted into a voice session, in a subsequent session transfer process, a method of transferring multiple voice sessions may be used to achieve the objective of transferring the sessions of the UE, and in this case, the technical solution according to the embodiment of the present invention does not include step 305.

Embodiment 2: A UE is transferred from a PS domain to a CS domain, the UE is involved in a video session in an active state and a voice session in an inactive state, and the UE and/or a network side do not support the SCUDIF feature.

Steps in this embodiment are basically the same as those in Embodiment 1 as shown in FIG. 3, and differences are as follows.

In the process where the UE initiates the transfer of the video session to the network side so that the network side transfers the video session to the CS domain, the UE and/or the network side do not support the SCUDIF feature, so relevant information for applying for the transmission bearer of the circuit switched domain is information for applying for the multimedia bearer.

In the CS domain, when the session state conversion is performed on the video session and the voice session, the UE uses a multimedia bearer to transmit a media stream of the voice session. Optionally, the UE and the MSC server may turn off the video channel of the multimedia bearer by H.245 signaling exchange, so as to prevent the UE from performing a video encoding or decoding and to prevent a waste of communication resources of the UE.

Embodiment 3: A UE is transferred from a PS domain to a CS domain, the UE is involved in a video session in an inactive state and a voice session in an active state, and the UE and a network side both support the SCUDIF feature.

Figure 6:
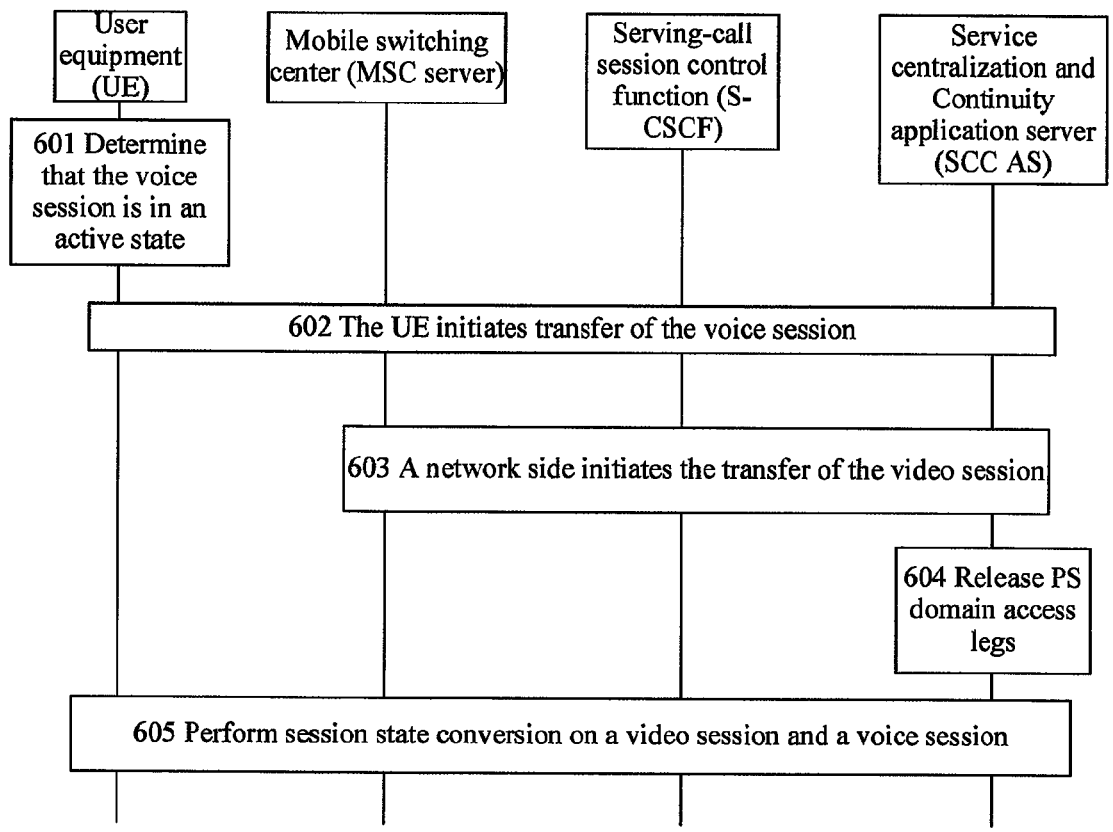
FIG. 6 is a timing diagram of a session transfer method according to Embodiment 3 of the present invention.

As shown in FIG. 6, a session transfer method according to the embodiment of the present invention includes the following.

Step 601: The UE determines that the voice session is in the active state.

In this embodiment, the UE pre-stores session state information, and can determine, according to the session state information, that the voice session is in the active state.

Step 602: The UE initiates transfer of the voice session to the network side, so that the network side transfers the voice session to the CS domain.

Figure 7:
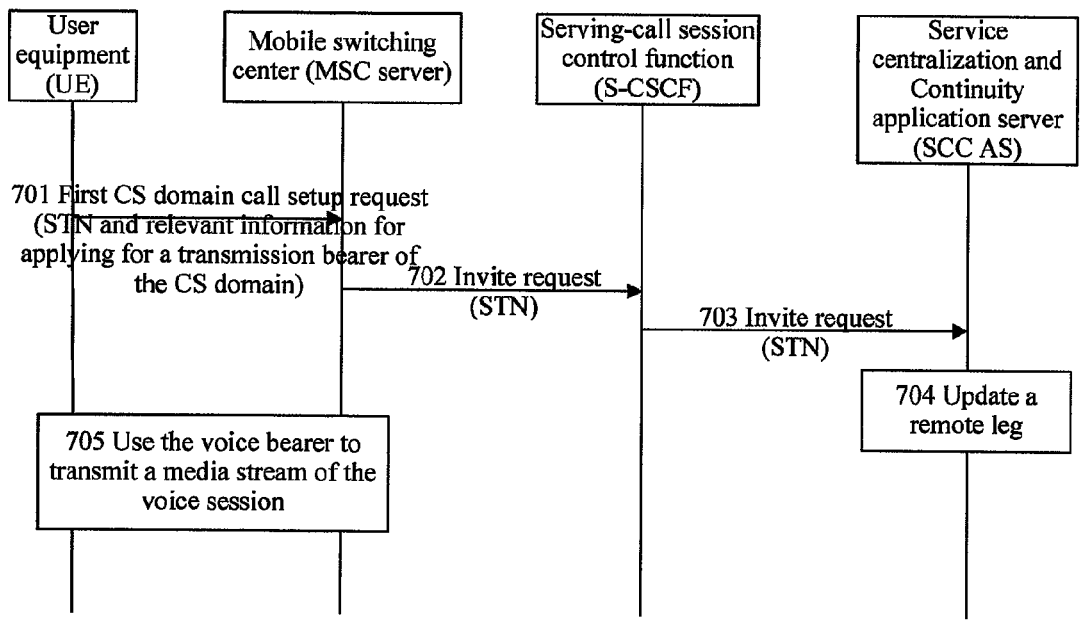
FIG. 7 is a timing diagram of step 602 in the session transfer method according to Embodiment 3 of the present invention as shown in FIG. 6.

As shown in FIG. 7, step 602 may include the following.

Steps 701 to 703: The UE sends a first CS domain call setup request, which carries an STN and relevant information for applying for a transmission bearer of the circuit switched domain, to an SCC AS through an MSC server and a serving-call session control function (Serving-Call Session Control Function, S-CSCF).

In this embodiment, the UE and the network side both support the SCUDIF feature, and the relevant information for applying for the transmission bearer of the circuit switched domain includes information for applying for a multimedia bearer and a voice bearer, and indication information indicating that a current transmission bearer (or a preferred transmission bearer) is the voice bearer.

Step 704: The SCC AS completes setup of a CS domain access leg (access leg) for the voice session, and updates a remote leg, where the remote leg is an access leg between the SCC AS and a peer end of the video session.

Step 705: The UE and the MSC server use the voice bearer to transmit a media stream (a voice media stream) of the voice session to complete the transfer of the voice session.

Step 603: The network side initiates and completes the transfer of the video session, which includes the following.

1. The SCC AS sends a transfer reply to the MSC server, and the transfer reply carries session state information of the video session.

In this embodiment, the session state information may include a session state (inactive), a session transfer identifier (STI), and session media streams (the voice media stream and a video media stream).

2. According to the session state information, the MSC server initiates, to the SCC AS, and completes the transfer of the session in the inactive state.

The MSC server sends an Invite request to the SCC AS, and the Invite request carries the STI of the video session.

The SCC AS waits for H.245 coding negotiation, and completes setup of a CS domain access leg for the video session after the negotiation is completed.

After the UE and the MSC server complete the H.245 negotiation in the CS domain, the SCC AS updates a remote leg of the video session and completes the transfer of the video session.

Step 604: After the transfer of the sessions (the video session and the voice session) of the UE is completed, PS domain access legs originally set up for the sessions (the video session and the voice session) of the UE are released.

Optionally, step 605: Perform session state conversion on the video session and the voice session in the CS domain.

In this embodiment, the video session is in the inactive state, the voice session is in the active state, and the state conversion is performed on the video session and the voice session. That is to say, the video session is converted into one in the active state and the voice session is converted into one in the inactive state.

Figure 8:
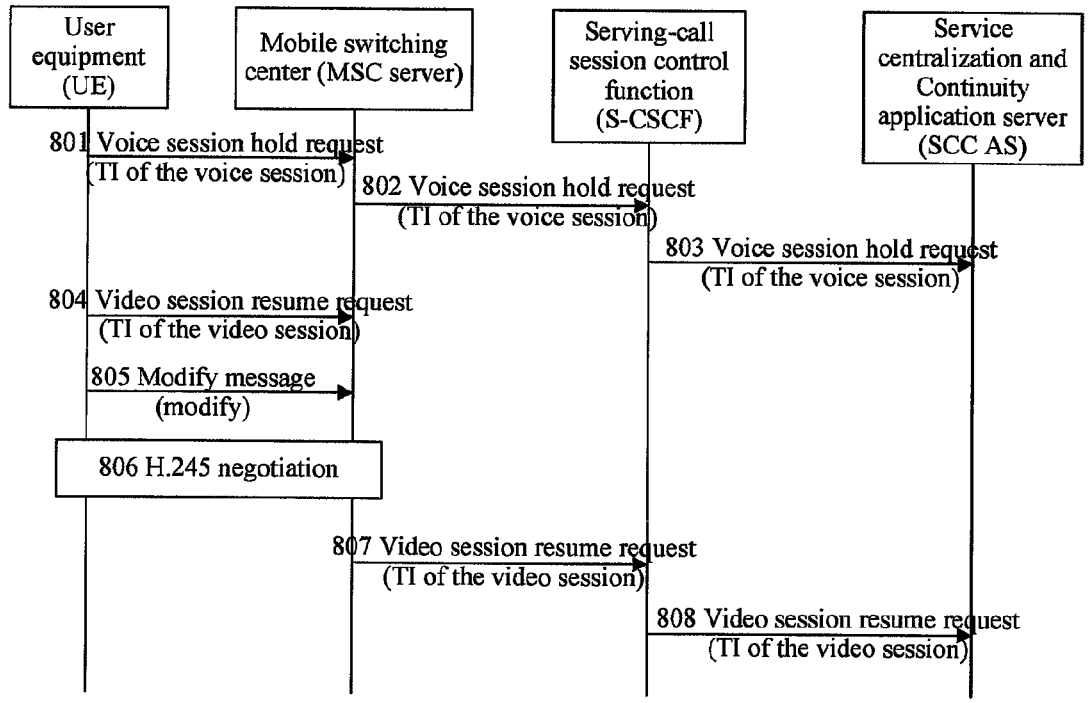
FIG. 8 is a timing diagram of step 605 of the session transfer method according to Embodiment 3 of the present invention as shown in FIG. 6.

As shown in FIG. 8, step 605 may include the following.

Steps 801 to 803: The UE sends a voice session hold request to the SCC AS, where the request carries a T associated with the voice session, and the SCC AS sends the voice hold (hold) request to the peer end of the voice session of the UE.

Step 804: The UE sends a video session resume request to the MSC server, where the request carries a TI of the video session.

Step 805: The UE sends a modify message to the MSC server to indicate that the multimedia bearer is set as the current bearer, that is, the media capability of the CS domain call is modified to support voice and video transmission (the media capability of the CS domain call before the state conversion supports voice transmission).

In practical use, step 805 may also be initiated by the network side, which is not described repeatedly herein.

Step 806: The UE and the MSC server perform H.245 coding negotiation in the CS domain, and use the multimedia bearer to transmit the media stream of the video session after the negotiation is completed.

Steps 807 and 808: The MSC server sends a voice session resume request to the SCC AS, and the SCC AS sends the request to the peer end of the video session of the UE, completing the state conversion of the video session and the voice session.

Optionally, in this embodiment, before step 602, the method may further include: deleting the video media stream of the video session.

By deleting the video media stream of the video session, the video session may be converted into a voice session, in a subsequent session transfer process, a method of transferring multiple voice sessions may be used to achieve the objective of transferring the sessions of the UE, and in this case, the technical solution according to the embodiment of the present invention does not include step 605.

Embodiment 4: A UE is transferred from a PS domain to a CS domain, the UE is involved in a video session in an inactive state and a voice session in an active state, and the UE and/or a network side do not support the SCUDIF feature.

Steps in this embodiment are basically the same as those in Embodiment 3 shown in FIG. 6, and differences are as follows.

In the process where the UE initiates the transfer of the voice session to the network side so that the network side transfers the voice session to the CS domain, the UE and/or the network side do not support the SCUDIF feature, so relevant information for applying for the transmission bearer of the circuit switched domain is information for applying for the voice bearer.

In the CS domain, when session state conversion is performed on the video session and the voice session, the UE and a MSC server release a CS domain call supporting a voice bearer and set up a CS domain call supporting a multimedia bearer, and the UE uses the multimedia bearer to transmit a media stream (a video media stream and a voice media stream) of the video session.

In this embodiment, the step where the UE and the MSC server set up the CS domain call supporting the multimedia bearer and the UE uses the multimedia bearer to transmit the media stream of the video session, may include the following.

A second CS domain call setup request is sent to the network side, where the second CS domain call setup request carries information for applying for the multimedia bearer of the circuit switched domain and a redial identifier. In this embodiment, the redial identifier may enable the MSC server to distinguish the second CS domain call request from a first CS domain call request. The multimedia bearer of the CS domain, where the multimedia bearer is allocated by the network side, is acquired. After setup of a second CS domain call is completed, the multimedia bearer of the CS is used to transmit the media stream of the video session.

It should be noted that, in this embodiment, the voice session hold request and the video session resume request, which are sent by the UE to the MSC server, are combined to indicate to the MSC server that the CS domain call supporting the voice bearer is to be released and the CS domain call supporting the multimedia bearer is to be set up.

In the session transfer method according to the embodiment of the present invention, the session in the active state among the video session and the voice session of the UE can be determined, and the transfer of the session in the active state can be initiated, so that the network side can transfer the session in the active state to the CS domain, and transfer the session in the inactive state, which achieves the objective that when the UE is involved in the video session and the voice session at the same time, the sessions of the UE are transferred.

Figure 9:
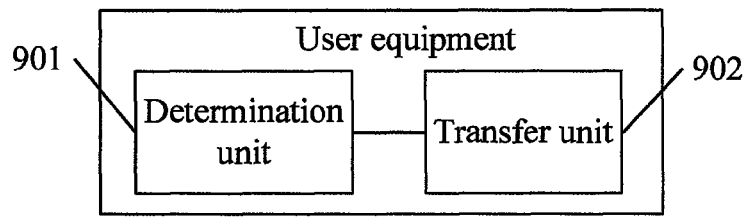
FIG. 9 is a first schematic structural diagram of a user equipment according to an embodiment of the present invention.

As shown in FIG. 9, an embodiment of the present invention provides a user equipment, which includes:

a determination unit 901, configured to determine a session in an active state among a video session and a voice session when sessions of the user equipment are transferred from a packet switched domain to a circuit switched domain and if the user equipment is involved in the video session and the voice session; and a transfer unit 902, configured to initiate transfer of the session in the active state, where the session in the active state is determined by the determination unit 901, so that a network side transfers the session in the active state to the circuit switched domain, and transfers a session in an inactive state among the video session and the voice session.

Figure 10:
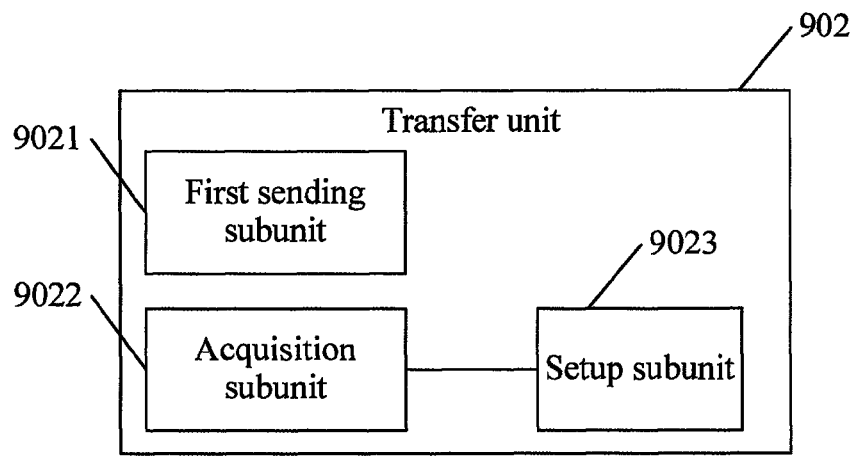
FIG. 10 is a schematic structural diagram of a transfer unit 902 of the user equipment according to the embodiment of the present invention as shown in FIG. 9.

Further, as shown in FIG. 10, the transfer unit 902 may include:

a first sending subunit 9021, configured to send a first circuit switched domain call setup request to the network side, where the first circuit switched domain call setup request carries an session transfer number and relevant information for applying for a transmission bearer of the circuit switched domain;

an acquisition subunit 9022, configured to acquire the transmission bearer of the circuit switched domain, where the transmission bearer is allocated by the network side; and a transmission subunit 9023, configured to use the transmission bearer of the circuit switched domain to transmit a media stream of the session in the active state, after setup of a first circuit switched domain call is completed.

Figure 11:
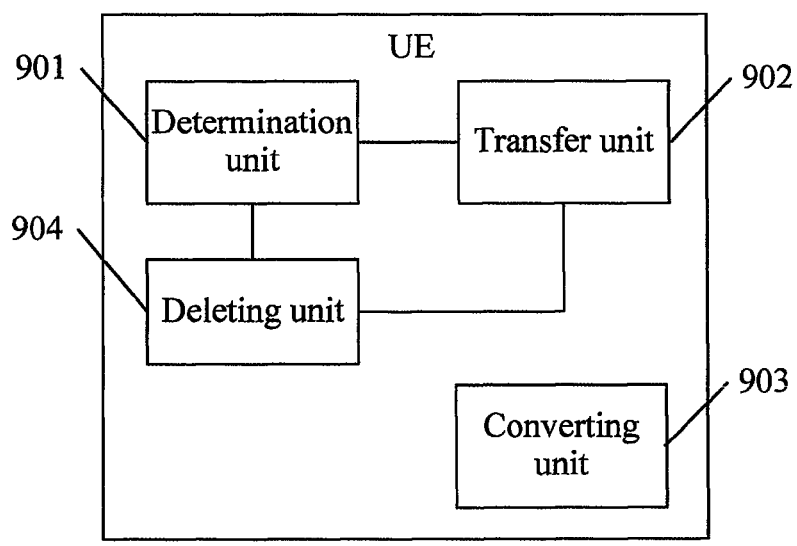
FIG. 11 is a second schematic structural diagram of a user equipment according to an embodiment of the present invention.

Further, as shown in FIG. 11, the user equipment may further include:

a converting unit 903, configured to perform session state conversion on the voice session and the video session in the circuit switched domain.

Figure 12:
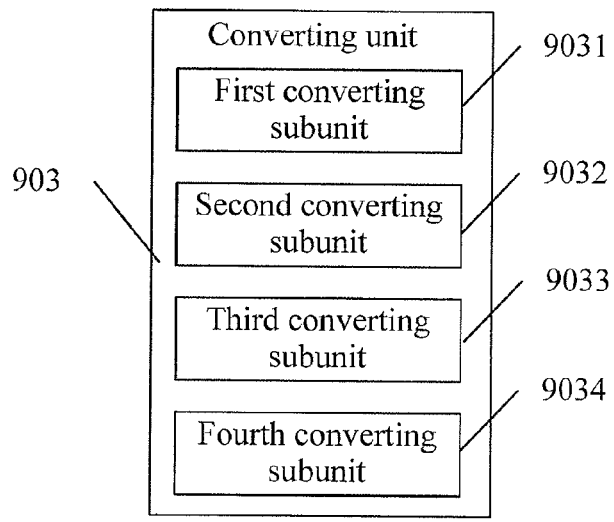
FIG. 12 is a schematic structural diagram of a converting unit 903 of the user equipment according to the embodiment of the present invention as shown in FIG. 11.

Furthermore, as shown in FIG. 12, the converting unit 903 may include one or more of the following subunits:

a first converting subunit 9031, configured to indicate a voice bearer as a current bearer and use the voice bearer to transmit a media stream of the voice session, when the video session is the session in the active state, the voice session is the session in the inactive state, and the transmission bearers of the circuit switched domain, where the transmission bearers of the circuit switched domain are acquired through application to the network side, are a multimedia bearer and the voice bearer;

a second converting subunit 9032, configured to use the multimedia bearer to transmit the media stream of the voice session, when the video session is the session in the active state, the voice session is the session in the inactive state, and the transmission bearer of the circuit switched domain, where the transmission bearer of the circuit switched domain is acquired through application to the network side, is the multimedia bearer;

a third converting subunit 9033, configured to indicate the multimedia bearer as the current bearer, perform coding negotiation with the network side, and use the multimedia bearer to transmit a media stream of the video session, when the video session is the session in the inactive state, the voice session is the session in the active state, and the transmission bearers of the circuit switched domain, where the transmission bearers of the circuit switched domain are acquired through application to the network side, are the multimedia bearer and the voice bearer; and a fourth converting subunit 9034, configured to release a circuit switched domain call supporting the voice bearer, set up a circuit switched domain call supporting the multimedia bearer, and use the multimedia bearer to transmit the media stream of the video session, when the video session is the session in the inactive state, the voice session is the session in the active state, and the transmission bearer of the circuit switched domain, where the transmission bearer of the circuit switched domain is acquired through application to the network side, is the voice bearer.

Further, as shown in FIG. 11, the user equipment may further include:

a deleting unit 904, configured to delete the video media stream of the video session.

For a specific implementation method of the user equipment according to the embodiment of the present invention, reference may be made to the description of the session transfer method according to the embodiment of the present invention, which is not described repeatedly herein.

The user equipment according to the embodiment of the present invention can determine the session in the active state among the video session and the voice session, and initiate the transfer of the session in the active state, so that the network side can transfer the session in the active state to the circuit switched domain, and transfer the session in the inactive state, which achieves the objective that when the user equipment is involved in the video session and the voice session at the same time, the sessions are transferred, and solves the problem that when the user equipment is involved in the video session and the voice session at the same time, the sessions of the user equipment cannot be transferred in the prior art.

In order to solve the problem that session transfer cannot be performed when a UE is involved in a voice session and a video session at the same time, embodiments of the present invention provide a session transfer method and a user equipment.

Figure 13:
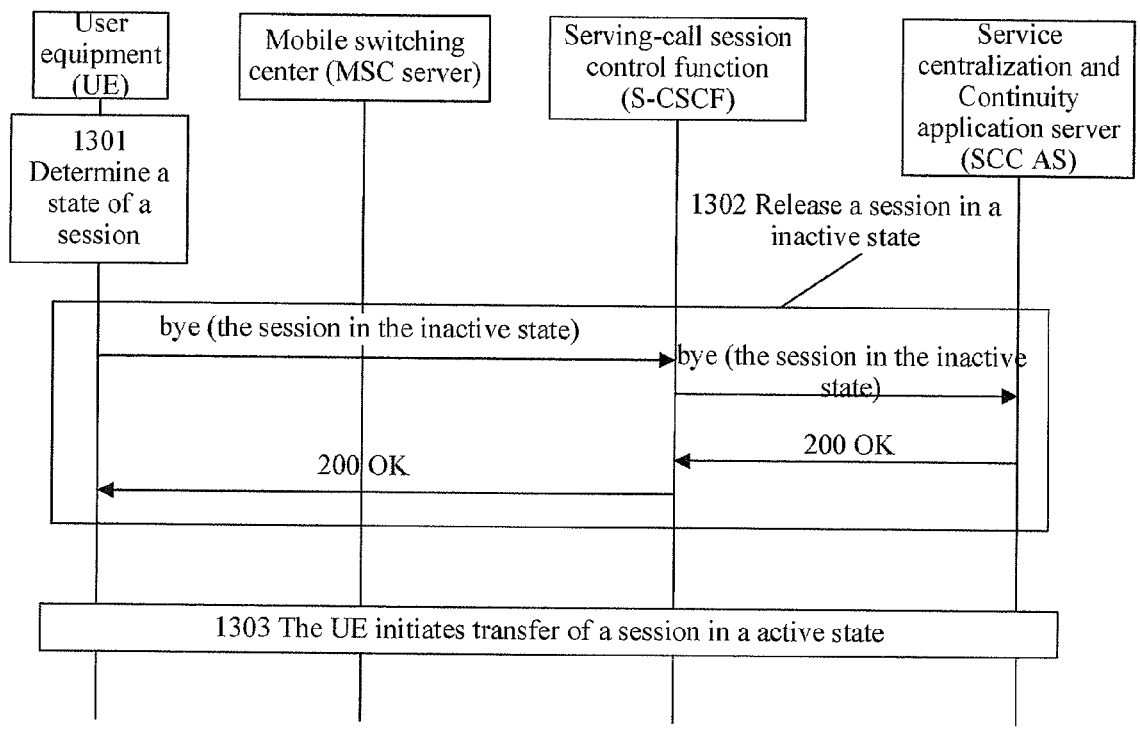
FIG. 13 is a timing diagram of a session transfer method according to an embodiment of the present invention.

As shown in FIG. 13, when a UE is transferred from a PS domain to a CS domain and if the UE is involved in a video session and a voice session, a session transfer method according to an embodiment of the present invention includes the following.

Step 1301: Determine a session in an active state and a session in an inactive state among the video session and the voice session.

Step 1302: Release the session in the inactive state.

Step 1303: Initiate transfer of the session in the active state, so that a network side transfers the session in the active state to the CS domain.

In the session transfer method according to the embodiment of the present invention, when the video session and the voice session of the UE are transferred, the session in the inactive state among the video session and the voice session is released, and the transfer of the session in the active state is initiated, so that the network side can transfer the session in the active state to the CS domain, which achieves the objective that when the UE is involved in the video session and the voice session at the same time, the session of the UE is transferred, and solves the problem that when the UE is involved in the video session and the voice session at the same time, the session of the UE cannot be transferred in the prior art.

Figure 14:
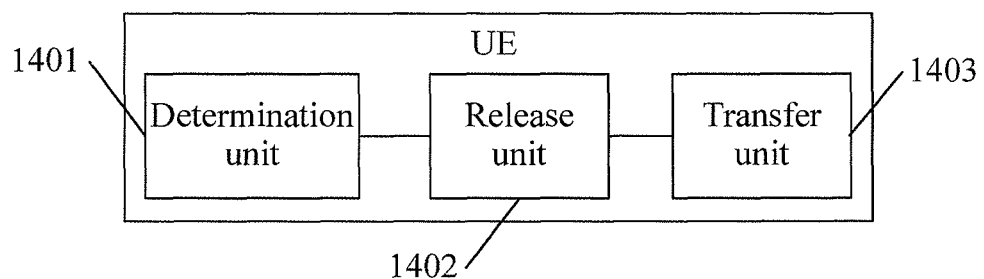
FIG. 14 is a schematic structural diagram of a user equipment according to an embodiment of the present invention.

As shown in FIG. 14, an embodiment of the present invention provides a user equipment, which includes:

a determination unit 1401, configured to determine a session in an active state and a session in an inactive state among a video session and a voice session when sessions of the user equipment are transferred from a packet switched domain to a circuit switched domain and if the user equipment is involved in the video session and the voice session;

a release unit 1402, configured to release the session in the inactive state, where the session in the inactive state is determined by the determination unit 1401; and a transfer unit 1403, configured to initiate transfer of the session in the active state, where the session in the active state is determined by the determination unit 1401, so that a network side transfers the session in the active state to the circuit switched domain.

In the user equipment according to the embodiment of the present invention, when the video session and the voice session are transferred, the session in the inactive state among the video session and the voice session is released, and the transfer of the session in the active state is initiated, so that the network side can transfer the session in the active state to the circuit switched domain, which achieves the objective that when the user equipment is involved in the video session and the voice session at the same time, the session of the user equipment is transferred, and solves the problem that when the user equipment is involved in the video session and the voice session at the same time, the session of the user equipment cannot be transferred in the prior art.

In view of the above, the session transfer method and the user equipment according to the embodiments of the present invention may be applied in a radio communication system.

Those of ordinary skill in the art can understand that all or a part of the steps of the method according to the embodiments may be implemented by a program instructing relevant hardware. The program may be stored in a computer readable storage medium, such as a ROM/RAM, a magnetic disk, or an optical disk.

The above descriptions are merely specific implementation manners of the present invention, but are not intended to limit the protection scope of the present invention. Any modification or replacement, which may be easily figured out by persons skilled in the art within the technical scope disclosed by the present invention, shall fall within the protection scope of the present invention. Therefore, the protection scope of the present invention shall subject to the protection scope of the claims.

The invention claimed is:

1. A session transfer method, comprising:
    when sessions of a user equipment are transferred from a packet switched domain to a circuit switched domain and if the user equipment is involved in a video session and a voice session, determining a session in an active state among the video session and the voice session; and
    initiating transfer of the session in the active state, so that a network side transfers the session in the active state to the circuit switched domain, and transfers a session in an inactive state among the video session and the voice session.

2. The method according to claim 1, wherein the initiating the transfer of the session in the active state comprises:
    sending a first circuit switched domain call setup request to the network side, wherein the first circuit switched domain call setup request carries a session transfer number and relevant information for applying for a transmission bearer of the circuit switched domain;
    acquiring the transmission bearer of the circuit switched domain, wherein the transmission bearer is allocated by the network side; and
    after setup of a first circuit switched domain call is completed, using the transmission bearer of the circuit switched domain to transmit a media stream of the session in the active state.

3. The method according to claim 2, wherein the relevant information for applying for the transmission bearer of the circuit switched domain comprises: information for applying for a multimedia bearer and a voice bearer of the circuit switched domain, and indication information indicating that the multimedia bearer or the voice bearer is a current transmission bearer or a preferred transmission bearer; or information for applying for the multimedia bearer of the circuit switched domain; or information for applying for the voice bearer of the circuit switched domain.

4. The method according to claim 1, wherein after the initiating the transfer of the session in the active state so that the network side transfers the session in the active state to the circuit switched domain and transfers the session in the inactive state among the video session and the voice session, the method further comprises:
    performing session state conversion on the video session and the voice session in the circuit switched domain.

5. The method according to claim 4, wherein the performing the session state conversion on the video session and the voice session comprises:
    indicating the voice bearer as a current bearer or a preferred bearer and using the voice bearer to transmit a media stream of the voice session, when the video session is the session in the active state, the voice session is the session in the inactive state, and the transmission bearers of the circuit switched domain, wherein the transmission bearers are acquired through application to the network side, are the multimedia bearer and the voice bearer; and/or
    using the multimedia bearer to transmit the media stream of the voice session, when the video session is the session in the active state, the voice session is the session in the inactive state, and the transmission bearer of the circuit switched domain, wherein the transmission bearer is acquired through application to the network side, is the multimedia bearer; and/or
    indicating the multimedia bearer as the current bearer or the preferred bearer, performing coding negotiation with the network side, and using the multimedia bearer to transmit a media stream of the video session, when the video session is the session in the inactive state, the voice session is the session in the active state, and the transmission bearers of the circuit switched domain, wherein the transmission bearers are acquired through application to the network side, are the multimedia bearer and the voice bearer; and/or
    releasing a circuit switched domain call supporting the voice bearer, setting up a circuit switched domain call supporting the multimedia bearer, and using the multimedia bearer to transmit the media stream of the video session, when the video session is the session in the inactive state, the voice session is the session in the active state, and the transmission bearer of the circuit switched domain, wherein the transmission bearer is acquired through application to the network side, is the voice bearer.

6. The method according to claim 5, wherein if the multimedia bearer is used to transmit the media stream of the voice session, the method further comprises: turning off a video channel of the multimedia bearer.

7. The method according to claim 5, wherein the setting up the circuit switched domain call supporting the multimedia bearer and using the multimedia bearer to transmit the media stream of the video session comprise:
    sending a second circuit switched domain call setup request to the network side, wherein the second circuit switched domain call setup request carries the information for applying for the multimedia bearer of the circuit switched domain and a redial identifier;
    acquiring the multimedia bearer of the circuit switched domain, wherein the multimedia bearer is allocated by the network side; and
    after setup of a second circuit switched domain call is completed, using the multimedia bearer of the circuit switched domain to transmit the media stream of the video session.

8. The method according to claim 1, wherein before the initiating the transfer of the session in the active state, the method further comprises: deleting a video media stream of the video session.

9. A user equipment, comprising:
    a determination unit, configured to determine a session in an active state among a video session and a voice session when sessions of the user equipment are transferred from a packet switched domain to a circuit switched domain and if the user equipment is involved in the video session and the voice session; and
    a transfer unit, configured to initiate transfer of the session in the active state, wherein the session in the active state is determined by the determination unit, so that a network side transfers the session in the active state to the circuit switched domain, and transfers a session in an inactive state among the video session and the voice session.

10. The user equipment according to claim 9, wherein the transfer unit comprises:
    a first sending subunit, configured to send a first circuit switched domain call setup request to the network side, wherein the first circuit switched domain call setup request carries a session transfer number and relevant information for applying for a transmission bearer of the circuit switched domain;
    an acquisition subunit, configured to acquire the transmission bearer of the circuit switched domain allocated by the network side; and
    a transmission subunit, configured to use the transmission bearer of the circuit switched domain to transmit a media stream of the session in the active state, after setup of a first circuit switched domain call is completed.

11. The user equipment according to claim 9, further comprising:
    a converting unit, configured to perform session state conversion on the voice session and the video session in the circuit switched domain.

12. The user equipment according to claim 11, wherein the converting unit comprises one or more of the following subunits:
    a first converting subunit, configured to indicate a voice bearer as a current bearer or the preferred bearer when the video session is the session in the active state, the voice session is the session in the inactive state, and the transmission bearers of the circuit switched domain, wherein the transmission bearers are acquired through application to the network side, are a multimedia bearer and the voice bearer, and use the voice bearer to transmit a media stream of the voice session;

a second converting subunit, configured to use the multimedia bearer to transmit the media stream of the voice session when the video session is the session in the active state, the voice session is the session in the inactive state, and the transmission bearer of the circuit switched domain, wherein the transmission bearer is acquired through application to the network side, is the multimedia bearer;

a third converting subunit, configured to indicate the multimedia bearer as the current bearer or the preferred bearer, perform coding negotiation with the network side, and use the multimedia bearer to transmit a media stream of the video session, when the video session is the session in the inactive state, the voice session is the session in the active state, and the transmission bearers of the circuit switched domain, wherein the transmission bearers are acquired through application to the network side, are the multimedia bearer and the voice bearer; and a fourth converting subunit, configured to release a circuit switched domain call supporting the voice bearer, set up a circuit switched domain call supporting the multimedia bearer, and use the multimedia bearer to transmit the media stream of the video session, when the video session is the session in the inactive state, the voice session is the session in the active state, and the transmission bearer of the circuit switched domain, wherein the transmission bearer is acquired through application to the network side, is the voice bearer.

13. The user equipment according to claim 9, further comprising:

a deleting unit, configured to delete a video media stream of the video session.

14. A session transfer method, comprising:

when sessions of a user equipment are transferred from a packet switched domain to a circuit switched domain and if the user equipment is involved in a video session and a voice session, determining a session in an active state and a session in an inactive state among the video session and the voice session; and releasing the session in the inactive state; and initiating transfer of the session in the active state, so that a network side transfers the session in the active state to the circuit switched domain.

15. A user equipment, comprising:

a determination unit, configured to determine a session in an active state and a session in an inactive state among a video session and a voice session when sessions of the user equipment are transferred from a packet switched domain to a circuit switched domain and if the user equipment is involved in the video session and the voice session; and a release unit, configured to release the session in the inactive state, wherein the session in the inactive state is determined by the determination unit; and a transfer unit, configured to initiate transfer of the session in the active state, wherein the session in the inactive state is determined by the determination unit, so that a network side transfers the session in the active state to the circuit switched domain.

* * * * *